Patented Nov. 21, 1950

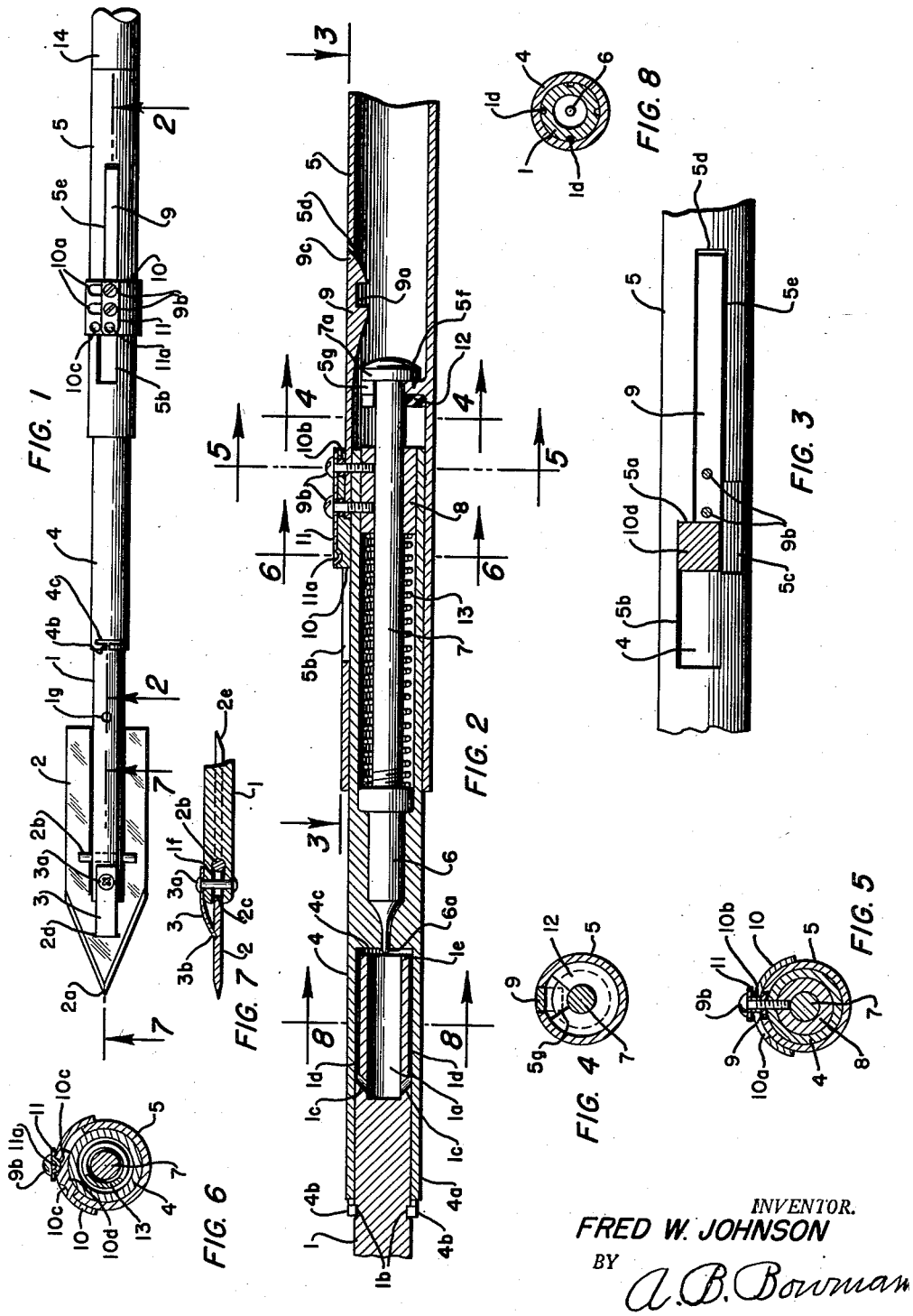

2,530,434

UNITED STATES PATENT OFFICE 2,530,434

POWER FISH SPEAR

Fred W. Johnson, San Diego, Calif.

Application February 8, 1946, Serial No. 646,334

8 Claims. (Cl. 102—48)

My invention relates to a power fish spear, more particularly for use in spearing large fish and the objects of my invention are:

First, to provide a spear of this class in which a blank cartridge is automatically detonated when the spearhead thereof contacts the fish for driving the spearhead, together with the connected cord through the fish for securely anchoring the fish to the line;

Second, to provide a spear of this class which may be propelled by hand into engagement with a large fish without undue effort, thus increasing the accuracy of placing the spear in contact with the fish;

Third, to provide a spear of this class in which a conventional blank cartridge is detonated in order to propel the spearhead from the spear handle when a fish is contacted by the spearhead;

Fourth, to provide a spear of this class in which conventional explosive cartridges may be used to propel the spearhead thereof;

Fifth, to provide a spear of this class in which the spearhead thereof automatically shifts to a laterally disposed relationship with the spearhead shank when the shank is retracted whereby maximum area of the spearhead opposes retraction thereof from the body of the fish;

Sixth, to provide a spear of this class in which the spearhead shank is reciprocally mounted in a breech tube having firing pin mechanism in connection therewith automatically releasable when the spearhead contacts the fish whereby the spearhead shank is expelled from the breech tube by gaseous pressure emitted from the cartridge recessed in the rear end of the spearhead shank;

Seventh, to provide a spear of this class having novel gas operated cartridge ejection means;

Eighth, to provide a spear of this class in which the breech tube is reciprocally mounted in a handle connection tube, wherein the firing pin mechanism is carried by the breech tube and the handle connection tube is provided with a sear engaging portion arranged to release the sear from the firing pin when the breech tube reciprocates in the handle connection tube;

Ninth, to provide a spear of this class having a novel firing mechanism safety and; Tenth, to provide a spear of this class which is very simple and economical in construction, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a fragmentary side elevational view of my power fish spear; Fig. 2 is an enlarged fragmentary sectional view taken from the line 2—2 of Fig. 1; Fig. 3 is a fragmentary sectional view taken from the line 3—3 of Fig. 2; Fig. 4 is a transverse sectional view taken from the line 4—4 of Fig. 2; Fig. 5 is a transverse sectional view taken from the line 5—5 of Fig. 2; Fig. 6 is a transverse sectional view taken from the line 6—6 of Fig. 2; Fig. 7 is a fragmentary sectional view taken from the line 7—7 of Fig. 1; and Fig. 8 is a transverse sectional view taken from the line 8—8 of Fig. 2.

Similar characters of reference refer to similar parts and portions throughout the several views of the drawings;

The spear shaft 1, spear head 2, detent spring 3, breech tube 4, handle connection tube 5, firing pin 6, firing pin shaft 7, firing pin guide 8, sear 9, safety 10, safety detent spring 11, recoil pad 12, firing pin spring 13, and the handle 14 constitute the principal parts and portions of my power fish spear.

The spear shaft 1 is provided with a cartridge receiving recess 1a in its rear end communicating with the end 6a of the firing pin 6 as shown best in Figure 2 of the drawing. It will be noted that the rear end of the spear shaft 1 is positioned in the bore portion 4a of the breech tube 4. At the end of the breech tube 4, the spear shaft 1 is provided with an annular groove portion 1b in which the resilient detent portions 4b of the breech tube 4 are engaged. As shown in Figure 1 of the drawing these detent portions 4b are relieved by the slotted portion 4c open at the forward end of the breech tube 4. Communicating with the cartridge receiving recess 1a in the rear of the spear shaft 1 are angularly disposed ports 1c, which communicate with longitudinally disposed channels 1d extending backwardly to the end 1e of the spear shaft 1 at its extremity. These channels 1d are shown in cross sections in Figure 8 of the drawing and are formed in the sidewall of the spear shaft 1 at the outer side of the cartridge receiving recess 1a all as shown best in Figures 2 and 8 of the drawing. It will be here noted that the cartridge receiving recess 1a is a firing chamber for a conventional rifle or pistol which may be detonated by the end portion 6a of the firing pin 6 engaging the primer thereof. The breech tube 4 is provided with the cartridge engaging face 4c arranged to support the head of the cartridge in certain relationship to the cartridge receiving recess 1a of the spear shaft 1. It will be noted that the dimensional disposition of the detents 4b and the angular groove 1b of the spear shaft 1 relative to the face 4c of the breech tube 4 controls head space of the cartridge in the cartridge receiving opening 1a all as shown best in Figure 2 of the drawing. The firing pin 6 is provided with a primer detonating end portion 6a reciprocally mounted in the breech tube 4 and communicating with the cartridge receiving recess 1a of the spear shaft 1. Screw threaded in the rear end of the firing pin 6 is the firing pin shaft 7. This firing pin shaft 7 is provided with an enlarged head portion 7a at its rear end engageable with the notch portion 9a of the sear 9 and which is a resilient member secured in connection with the breech tube 4 by means of the screws 9b. These screws 9b secure the firing pin guide 8 in connection with the breech tube 4 and serve as guides for the safety 10 which is provided with slots 10a about the spacers 10b on the outer side of the screws 9b. These spacers 10b are positioned intermediate the safety detent spring 11 and the sear 9 maintaining sliding tolerance for the safety 10 intermediate the detent spring 11 and the breech tube 4 and sear 9. As shown in Figure 5 of the drawing the slotted portions 10a in the safety member 10 permit peripheral movement of the safety 10 about the outer side of the tube 5. The safety detent spring 11 as shown in Figures 2 and 6 of the drawings is provided with a detent nib 11a arranged to engage the detent recess portions 10c of the safety member 10 for maintaining the same in certain positions. The safety member 10 is provided with a safety lug 10d as shown best in Figures 3 and 6 of the drawing which longitudinally engages the shoulder portion 5a of the slotted portion 5b of the tube 5 when in safety position. The safety lug 10d in connection with the safety member 10 is arranged to be positioned in the slotted portion 5c of the tube 5 which is offset from the slotted portion 5b permitting the safety member 10 to travel longitudinally of the tube 5 toward the sear tripping incline 5d which is engageable with the inclined portion 9c at the end of the sear 9 for deflecting the same out of engagement with the head portion 7a of the firing pin 7. The firing pin spring 13 is interposed between the firing pin 6 and the firing pin guide 8 as shown best in Figure 2 of the drawing tending to force the firing pin 6 toward the cartridge receiving recess 1a of the spear shaft 1. The tube 5 is provided with a slotted portion 5e in which the sear 9 is reciprocally mounted as shown best in Figure 3 of the drawings. As shown in Figs. 2 and 4 of the drawings, the recoil pad 12 is positioned adjacent an integral inwardly extending shoulder 5f of the tube 5. This shoulder 5f is provided with a cutaway portion 5g at its top side through which the notch portion 9a of the sear 9 passes when cocking the firing pin and compressing the firing pin spring 13. The handle 14 may be any length desired and is connected with the tube 5 as shown in Fig. 1 of the drawings. The spearhead 2 is substantially U shaped and provided with a pointed portion 2a at its enclosed end which is relatively sharp. In connection with this spearhead 2 is a laterally disposed axle 2b positioned in the slotted portion 1f of the spear shaft at the extended end thereof as shown best in Fig. 7 of the drawings. It will be noted that the axle 2b is reciprocally mounted in the slotted portion 1f and limited in reciprocal movement by the pin 3a holding the spearhead detent spring 3, all as shown best in Fig. 7 of the drawings. As shown in Fig. 7 of the drawings the enclosed end portion 2c of the spearhead 2 is positioned within the end of the spear shaft 1 and the slotted portion 1f and is maintained therein by the end 3b of the detent spring 3 in a recess portion 2d of the spearhead 2. The rear end portions 2e of the spearhead 2 are beveled and these beveled portions 2e tend to shift the spearhead 2 laterally when the spear shaft 1 is retracted and the portions 2e engage flesh of a fish through which the spearhead 2 has passed, in this manner the axle portion 2b is reciprocated in the slotted portion releasing the enclosed end 2c of the spearhead 2 from the notched portion 1f permitting the spearhead 2 to turn crosswise of the spear shaft 1 on the axle 2b.

The operation of my power fish spear is substantially as follows:

The cartridge is placed in the cartridge receiving recess 1a of the spear shaft 1 and, this cartridge may be a conventional pistol or rifle cartridge employing a blank load which includes a primer and powder. The safety member 10 is shifted so that the lug 10d is adjacent the slotted portion 5c permitting the same to travel backwardly toward the incline 5d of the tube 5, whereon, the incline portion 9c of the sear 9 is engageable for releasing the firing pin shaft 7, permitting the firing pin 6 to travel forwardly, in the breach tube 4, to engage the primer of the cartridge in the recess portion 1a of the spear shaft 1. The firing pin 6 is cocked by forcing the breach tube 4 forwardly and retaining the tube 5 in stationary position. This cocking operation may be accomplished only when the lug portion 10d of the safety member 10 is in the slotted portion 5b as shown in Fig. 3 of the drawings. The shoulder 5f retains the head 7a, of the firing pin shaft 7, while the firing pin spring 13 is compressed intermediate the firing pin guide 8 and the firing pin 6. When the breech tube 4 is moved forwardly relatively to the tube 5 the sear 9 is carried with the breech tube 4, whereupon, it snaps over the shoulder portion 7a of the firing pin shaft 7 maintaining the firing pin spring in compression. After cocking the firing pin 6 the lug 10d, of the safety 10, is automatically in position against the shoulder 5a maintaining the same in safe, cocked position. When the operator is ready to fire the spear shaft 1 out of the breech tube 4, the safety 10 is shifted so that the lug portion 10d rests in the slotted portion 5c. The detent spring 11 maintains the safety member 10 in adjusted position by means of its engagement with the recesses 10c of the safety member 10. When the spear is held by the handle 14, and thrown into engagement with a fish, the spearhead 2 contacts the fish causing the inertia of the handle to pass forwardly relatively to the breech tube 4 causing the sear incline portion 9c to pass upwardly over the incline 5d, of the tube 5, releasing the notched portion 9a, from the head 7a, of the firing pin shaft 7, releasing the firing pin 6 permitting the same to detonate the cartridge in the cartridge receiving recess 1a, whereupon, explosion occurs and forces the spear shaft 1, together with the spearhead 2, through the fish which it contacts. When the spearhead 1 is limited by a cord passing through the opening 1g thereof and attached to a windlass or the like, the angular portions 2e at the rear end of the spearhead 2, engages flesh of the fish forcing the spearhead 2 longitudinally of the slotted portion 1f, in the shaft 1, releasing the detent spring 3 and permitting the incline portions 2e to shift the spearhead clockwise of the shaft 1, preventing the same from being pulled backwardly through the fish when restrained by a cord extending through the opening 1g of the shaft 1 as hereinbefore set forth. The detent portions 4b, in connection with the breech tube 4 in the annular groove 1b of the shaft 1, maintain the same in position until the cartridge is fired in the recess 1a which forms a gas chamber for the explosion of the cartridge. Upon explosion of the cartridge gas passes through the ports 1c and backwardly through the channels 1d to the rear of the cartridge case, this gaseous operation pressurizes the cartridge at its head portion and expels the same from the breech tube 4 when the spear shaft 1 passes out of the bore 4a, of the breech tube 4.

Though I have shown and described a particular construction, combination and arrangement of parts and portions, I do not wish to be limited to the particularl construction, combination and arrangement, but desire to include in the scope of my invention the construction, combination and arrangement substantially as set forth in the appended claims.

Having thus described my invention, what I claim as new and desire to secure by Letters Patent is:

1. In a power fish spear of the class described, the combination of a spearhead, a shaft in connection with said spearhead having a cartridge receiving chamber at its rear portion and a breech tube having a bore portion in which the rear end of said shaft is slidably positioned.

2. In a power fish spear of the class described, the combination of a spearhead, a shaft in connection with said spearhead having a cartridge receiving chamber at its rear portion, a breech tube having a bore portion in which the rear end of said shaft is slidably positioned and a cartridge firing mechanism in connection with said breech tube.

3. In a power fish spear of the class described, the combination of a spearhead, a shaft in connection with said spearhead having a cartridge receiving chamber at its rear portion, a breech tube having a bore portion in which the rear end of said shaft is slidably positioned, a cartridge firing mechanism in connection with said breech tube and a second tube in which said breech tube is reciprocally mounted having trip means operatively engageable with said cartridge firing mechanism for releasing said cartridge firing mechanism when said breech tube is reciprocally moved by inertia in said second tube.

4. In a power fish spear of the class described, the combination of a spear shaft having a spearhead in connection with one end and a cartridge chamber in its opposite end, a breech tube in which the cartridge chamber portion of said spear shaft is reciprocally mounted, a firing pin in said breech tube, a resilient sear in connection with said breech tube and operatively associated with said firing pin, a second tube reciprocally mounted on the outer side of said breech tube and having sear trip portions engageable with said sear when said breech tube is reciprocally operated in said second tube.

5. In a power fish spear of the class described, the combination of a spear shaft having a spearhead in connection with one end and a cartridge chamber in its opposite end, a breech tube in which the cartridge chamber portion of said spear shaft is reciprocally mounted, a firing pin in said breech tube, a resilient sear in connection with said breech tube and operatively associated with said firing pin, a second tube reciprocally mounted on the outer side of said breech tube and having sear trip portions engageable with said sear when said breech tube is reciprocally operated in said second tube, said second tube having a shoulder, operatively engageable with said firing pin, for restraining the same when engaging said sear with said firing pin.

6. In a power fish spear of the class described, the combination of a spear shaft having a spearhead in connection with one end and a cartridge chamber in its opposite end, a breech tube in which the cartridge chamber portion of said spear shaft is reciprocally mounted, a firing pin in said breech tube, a resilient sear in connection with said breech tube and operatively associated with said firing pin, a second tube reciprocally mounted on the outer side of said breech tube and having sear trip portions engageable with said sear when said breech tube is reciprocally operated in said second tube, said second tube having a shoulder, operatively engageable with said firing pin, for restraining the same when engaging said sear with said firing pin, a safety member secured in connection with said breech tube, said second tube having offset slotted portions in the side wall thereof in which said safety member is engaged, whereby, said safety member limits the movements of said breech tube in said second tube by engagement with said offset slotted portion, preventing said sear from engaging the trip portions of said second tube.

7. In a power fish spear of the class described, the combination of a spear shaft having a spearhead on one end and a cartridge chamber in the opposite end, a breech tube having a bore in one end in which the chamber end of said spear shaft is positioned, detent means at the extended end of said breech tube, said spear shaft having annular groove portions engageable with said detent means for maintaining said cartridge chamber in set position in said breech tube.

8. In a power fish spear of the class described, the combination of a spear shaft having a spearhead in connection with one end and a cartridge receiving chamber in its opposite end, a breech tube in which the cartridge receiving chamber end of said spear shaft is positioned, said spear shaft having ports communicating with said chamber and channel portions at the outer side of said shaft communicating with said ports and extending backwardly to the open end of said chamber.

FRED W. JOHNSON.

REFERENCES CITED

The following references are of record in the file of this patent:

UNITED STATES PATENTS

| Number | Name | Date |
| --- | --- | --- |
| Re. 9,356 | Pierce | Aug. 24, 1880 |
| 17,370 | Grudchos | May 26, 1857 |
| 385,416 | Luscomb et al. | July 3, 1888 |
| 1,052,606 | Maxim | Feb. 11, 1913 |
| 1,344,693 | Hinsdale | June 29, 1920 |

FOREIGN PATENTS

| Number | Country | Date |
| --- | --- | --- |
| 12,772 | Norway | Mar. 4, 1903 |
| 206,155 | Germany | Jan. 29, 1909 |